US012614066B2

(12) United States Patent
Clement et al.

(10) Patent No.: US 12,614,066 B2
(45) Date of Patent: Apr. 28, 2026

(54) DISTILLING TRANSFORMERS FOR NEURAL CROSS-DOMAIN SEARCH

(71) Applicant: MICROSOFT TECHNOLOGY LICENSING, LLC., Redmond, WA (US)

(72) Inventors: Colin Bruce Clement, Seattle, WA (US); Dawn Drain, Bellevue, WA (US); Neelakantan Sundaresan, Bellevue, WA (US); Chen Wu, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 1106 days.

(21) Appl. No.: 17/382,341

(22) Filed: Jul. 22, 2021

(65) Prior Publication Data

US 2023/0042051 A1     Feb. 9, 2023

(51) Int. Cl.
| | |
|---|---|
| *G06F 8/30* | (2018.01) |
| *G06F 8/40* | (2018.01) |
| *G06F 8/51* | (2018.01) |
| *G06F 8/74* | (2018.01) |
| *G06F 18/10* | (2023.01) |
| *G06F 40/42* | (2020.01) |
| *G06N 3/045* | (2023.01) |
| *G06N 3/0455* | (2023.01) |
| *G06N 3/08* | (2023.01) |
| *G06N 3/091* | (2023.01) |
| *G06N 3/096* | (2023.01) |

(52) U.S. Cl.
CPC ................ *G06N 3/08* (2013.01); *G06F 8/40* (2013.01); *G06F 18/10* (2023.01); *G06F 40/42* (2020.01); *G06N 3/045* (2023.01)

(58) Field of Classification Search
CPC .......... G06N 3/045; G06N 3/08; G06F 18/10; G06F 40/42; G06F 8/40
See application file for complete search history.

(56) References Cited

U.S. PATENT DOCUMENTS

| | | | | |
|---|---|---|---|---|
| 11,775,271 B1 * | 10/2023 | Singh | ....................... | G06N 3/08 |
| | | | | 717/137 |
| 2016/0332079 A1 * | 11/2016 | Mugan | ................... | G06N 3/044 |

(Continued)

OTHER PUBLICATIONS

Thakur et al., "Augmented SBERT: Data Augmentation Method for Improving Bi-encoders for Pairwise Sentence Scoring Tasks", Apr. 12, 2021, arXiv:2010.08240v2, 15 Pages (Year: 2021).*

(Continued)

*Primary Examiner* — Kamran Afshar
*Assistant Examiner* — Steven Phung
(74) *Attorney, Agent, or Firm* — Workman Nydegger

(57) ABSTRACT

A distillation system extracts knowledge from a large pre-trained sequence-to-sequence neural transformer model into a smaller bi-encoder. The pre-trained sequence-to-sequence neural transformer model is trained to translate data from a first domain into a second domain on a large corpus. A teacher model is generated from the pre-trained model by fine-tuning the pre-trained neural transformer model on a smaller translation task with true translation pairs. The fine-tuned model is then used to generate augmented data values which are used with the true translation pairs to train the bi-encoder. The bi-encoder is used for perform cross-domain searches.

20 Claims, 9 Drawing Sheets

(56)                 References Cited

U.S. PATENT DOCUMENTS

| | | | | |
|---|---|---|---|---|
| 2019/0325308 A1* | 10/2019 | Chung | ........... | G06F 40/216 |
| 2020/0117446 A1* | 4/2020 | Smith | ........... | G06F 8/71 |
| 2020/0242123 A1* | 7/2020 | Venkoba | ........... | G06F 16/248 |
| 2021/0142164 A1* | 5/2021 | Liu | ........... | G06F 40/216 |
| 2021/0279595 A1* | 9/2021 | Sridhar | ........... | G06N 3/084 |

OTHER PUBLICATIONS

Tufano et al., "Unit Test Case Generation with Transformers and Focal Context", May 20, 2021, arXiv:2009.05617v2, pp. 1-15 (Year: 2021).*

Lewis et al., "BART: Denoising Sequence-to-Sequence Pre-training for Natural Language Generation, Translation, and Comprehension", Oct. 29, 2019, arXiv preprint arXiv:1910.13461 (2019). (Year: 2019).*

Bonab, et al., "Training Effective Neural CLIR by Bridging the Translation Gap", In Proceedings of the 43rd International ACM SIGIR Conference on Research and Development in Information Retrieval, Jul. 25, 2020, pp. 9-18.

Boualili, et al., "MarkedBERT: Integrating Traditional IR Cues in Pre-trained Language Models for Passage Retrieval", In Proceedings of the 43rd International ACM SIGIR Conference on Research and Development in Information Retrieval, Jul. 25, 2020. pp. 1977-1980.

Cambronero, et al., "When Deep Learning Met Code Search", In Proceedings of the 27th ACM Joint Meeting on European Software Engineering Conference and Symposium on the Foundations of Software Engineering, Aug. 26, 2019, pp. 964-974.

Clement, et al. "PyMT5: Multi-mode Translation of Natural Language and Python Code with Transformers", In Proceedings of the Conference on Empirical Methods in Natural Language Processing, Nov. 16, 2020, pp. 9052-9065.

Feng, et al., "CodeBERT: A Pre-Trained Model for Programming and Natural Languages", In Journal of Computing Research Repository, Apr. 27, 2020, 10 Pages.

Gu, et al., "Deep Code Search", In Proceedings of the IEEE/ACM 40th International Conference on Software Engineering (ICSE), May 27, 2018, pp. 933-944.

Guo, et al., "GraphCodeBERT: Pre-training Code Representations with Data Flow", In Repository of arXiv:2009.08366v2. Sep. 29, 2020, pp. 1-14.

Hinton, et al., "Distilling the Knowledge in a Neural Network", In Repository of arXiv:1503.02531v1, Mar. 9, 2015, 9 Pages.

Husain, et al., "CodeSearchNet Challenge: Evaluating the State of Semantic Code Search", In Repository of arXiv:1909.09436v1, Sep. 20, 2019. 6 pages.

Jaynes, Edwint., "Information Theory and Statistical Mechanics", In Journal of Physical review , vol. 106, Issue 4, May 15, 1957, pp. 620-630.

Khattab, et al., "Colbert: Efficient and Effective Passage Search via Contextualized Late Interaction Over Bert", In Proceedings of the 43rd International ACM SIGIR Conference on Research and Development in Information Retrieval, Jul. 25, 2020, pp. 39-48.

Lachaux, et al., "Unsupervised Translation of Programming Languages", In Repository of arXiv:2006.03611v1, Jun. 5, 2020, pp. 1-21.

Macavaney, et al., "Efficient Document Re-Ranking for Transformers by Precomputing Term Representations", In Proceedings of the 43rd International ACM SIGIR Conference on Research and Development in Information Retrieval, Jul. 25, 2020, pp. 49-58.

Matsubara, et al.. "Reranking for Efficient Transformer-Based Answer Selection", In Proceedings of the 43rd International ACM SIGIR Conference on Research and Development in Information Retrieval, Jul. 25, 2020, pp. 1577-1680.

Oord, et al., "Parallel Wavenet: Fast High-Fidelity Speech Synthesis", In International conference on machine learning, in International conference on machine learning, Jul. 3, 2018, 9 Pages.

Oord, et al., "WaveNet: A Generative Model for Raw Audio", in Repository of arXiv:1609.03499, Sep. 19, 2016, 15 Pages.

Penha, et al., "On the Calibration and Uncertainty of Neural Learning to Rank Models", in Repository of arXiv:2101.04356v1, Jan. 12, 2021, 11 Pages.

Svyatkovskiy, et al., "IntelliCode Compose: Code Generation using Transformer", in Proceedings of the 28th ACM Joint Meeting on European Software Engineering Conference and Symposium on the Foundations of Software Engineering, Nov. 8, 2020, 1433-1443.

Tufano, et al., "Unit Test Case Generation with Transformers". In Repository of arXiv:2009.05617v1, Sep. 11, 2020, 11 Pages.

Vaswani, et al., "Attention is all You Need", in Repository of arXiv:1706.03762v1, Jun. 12, 2017, 15 Pages.

Wang, et al., "On the Inference Calibration of Neural Machine Translation", in Repository of arXiv:2005.00963v1, May 3, 2020, 10 Pages.

Zamani, et al., "Analyzing and Learning from User Interactions for Search Clarification", in Proceedings of the 43rd International ACM SIGIR Conference on Research and Development in Information Retrieval, Jul. 25, 2020, pp. 1181-1190.

Ahmad, et al., "Unified Pre-training for Program Understanding and Generation", in Repository of arXiv:2103.06333v2, Apr. 10, 2021, 14 Pages.

"International Search Report and Written Opinion Issued in PCT Application No. PCT/US22/031701", Mailed Date: Oct. 10, 2022, 15 Pages.

Thakur, et al., "Augmented SBERT: Data Augmentation Method for Improving Bi-Encoders for Pairwise Sentence Scoring Tasks", in repository of arXiv:2010.08240v2, Apr. 12, 2021, 15 Pages.

Tufano, et al., "Unit Test Case Generation with Transformers and Focal Context", in repository of arXiv:2009.05617v2, May 20, 2021, pp. 1-15.

Communication pursuant to Article 94(3) EPC, Received for European Application No. 22735716.7, (Ms# 410341-EP01-PCT) mailed on May 9, 2025, 15 pages.

Communication under Rule 71(3) EPC received for EP Application No. 22735716.7, (MS# 410341-EP01-PCT) mailed on Jan. 15, 2026, 8 Pages.

* cited by examiner

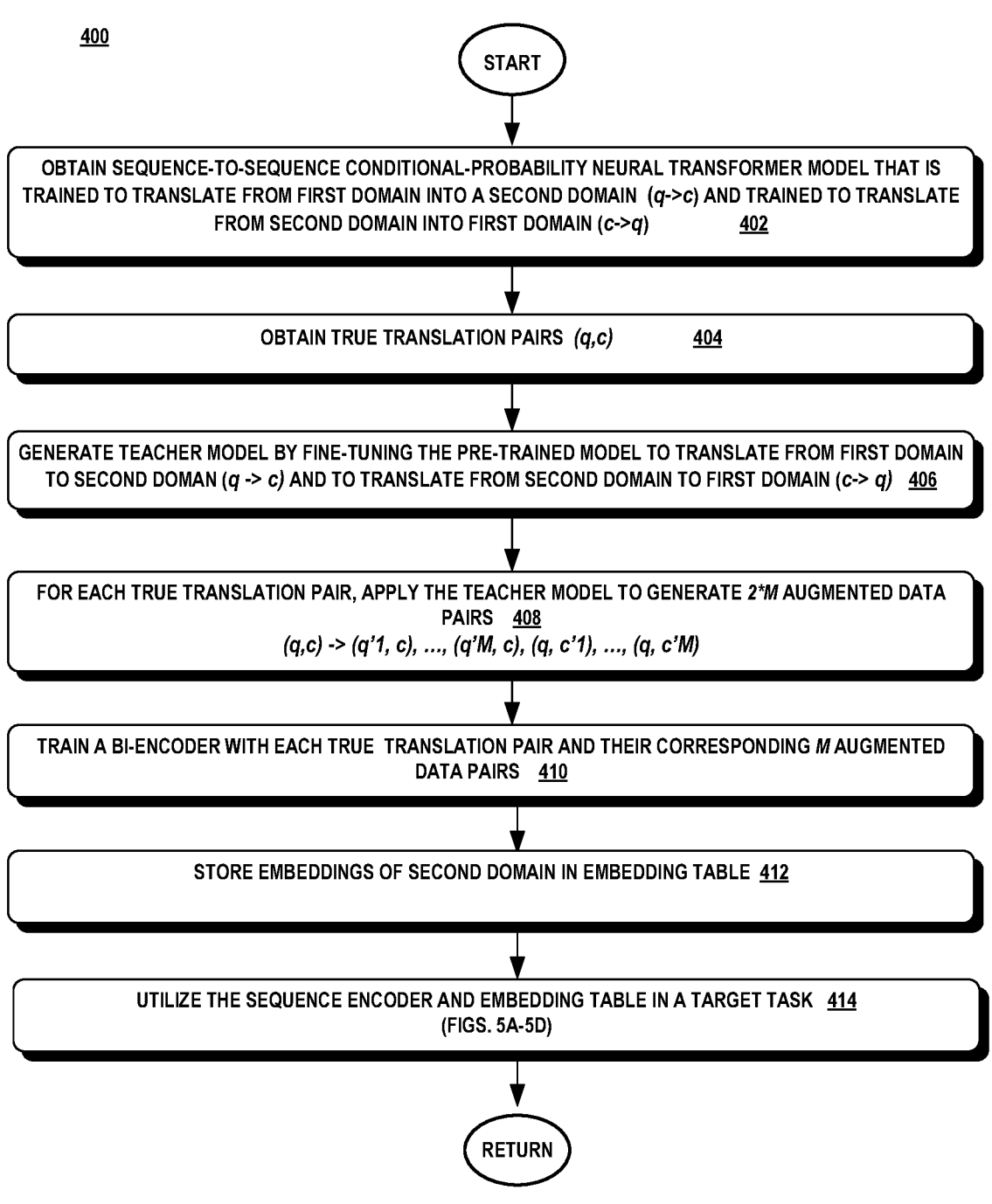

400

START

OBTAIN SEQUENCE-TO-SEQUENCE CONDITIONAL-PROBABILITY NEURAL TRANSFORMER MODEL THAT IS TRAINED TO TRANSLATE FROM FIRST DOMAIN INTO A SECOND DOMAIN  *(q->c)* AND TRAINED TO TRANSLATE FROM SECOND DOMAIN INTO FIRST DOMAIN *(c->q)*        402

OBTAIN TRUE TRANSLATION PAIRS *(q,c)*        404

GENERATE TEACHER MODEL BY FINE-TUNING THE PRE-TRAINED MODEL TO TRANSLATE FROM FIRST DOMAIN TO SECOND DOMAN *(q -> c)* AND TO TRANSLATE FROM SECOND DOMAIN TO FIRST DOMAIN *(c-> q)*  406

FOR EACH TRUE TRANSLATION PAIR, APPLY THE TEACHER MODEL TO GENERATE *2*M* AUGMENTED DATA PAIRS   408
*(q,c) -> (q'1, c), ..., (q'M, c), (q, c'1), ..., (q, c'M)*

TRAIN A BI-ENCODER WITH EACH TRUE  TRANSLATION PAIR AND THEIR CORRESPONDING *M* AUGMENTED DATA PAIRS   410

STORE EMBEDDINGS OF SECOND DOMAIN IN EMBEDDING TABLE 412

UTILIZE THE SEQUENCE ENCODER AND EMBEDDING TABLE IN A TARGET TASK   414
(FIGS. 5A-5D)

RETURN

*FIG. 4*

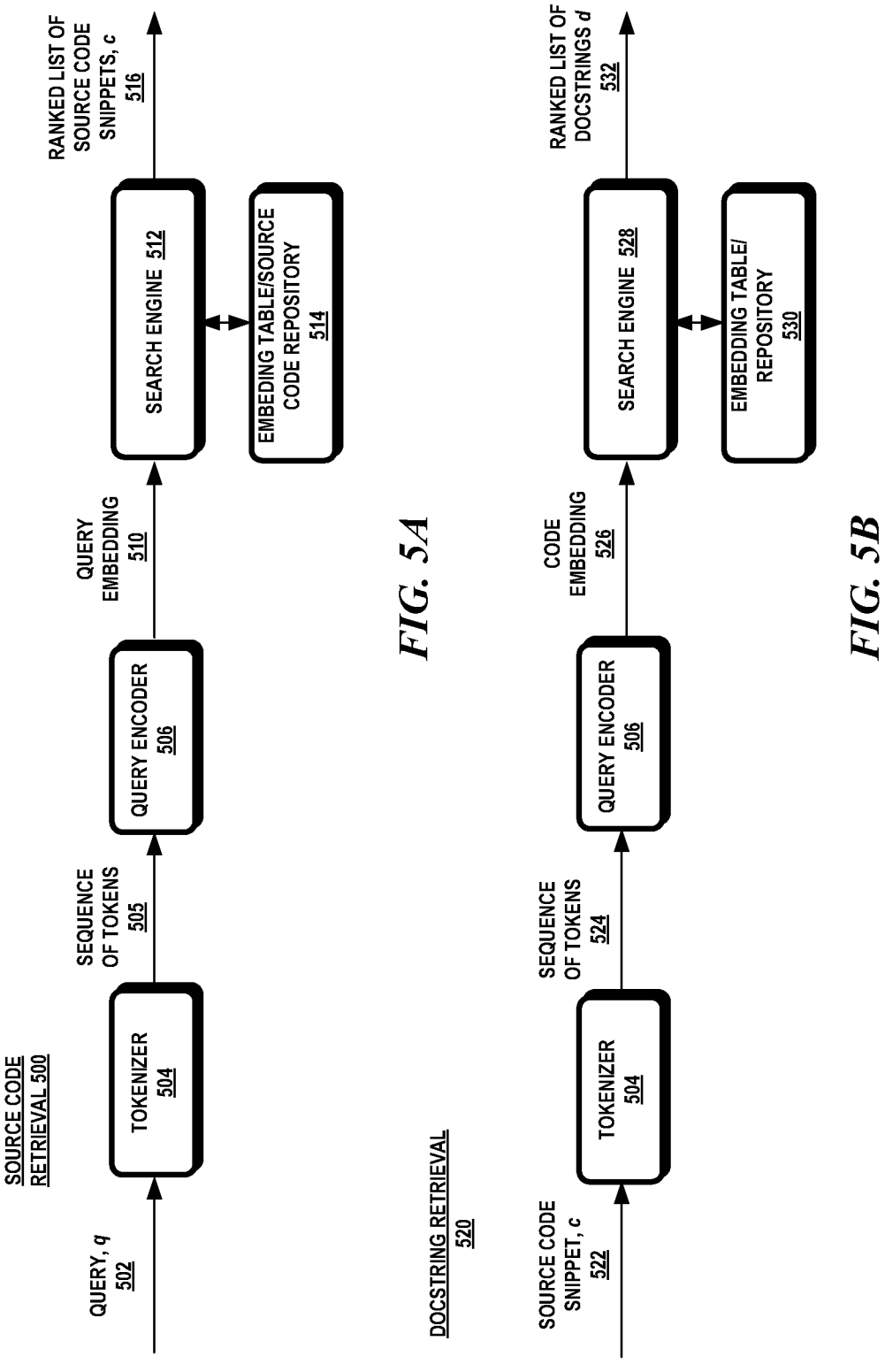

SOURCE CODE RETRIEVAL 500

QUERY, q 502 → TOKENIZER 504 → SEQUENCE OF TOKENS 505 → QUERY ENCODER 506 → QUERY EMBEDDING 510 → SEARCH ENGINE 512 → RANKED LIST OF SOURCE CODE SNIPPETS, c 516

EMBEDING TABLE/SOURCE CODE REPOSITORY 514

FIG. 5A

DOCSTRING RETRIEVAL 520

SOURCE CODE SNIPPET, c 522 → TOKENIZER 504 → SEQUENCE OF TOKENS 524 → QUERY ENCODER 506 → CODE EMBEDDING 526 → SEARCH ENGINE 528 → RANKED LIST OF DOCSTRINGS d 532

EMBEDDING TABLE/ REPOSITORY 530

FIG. 5B

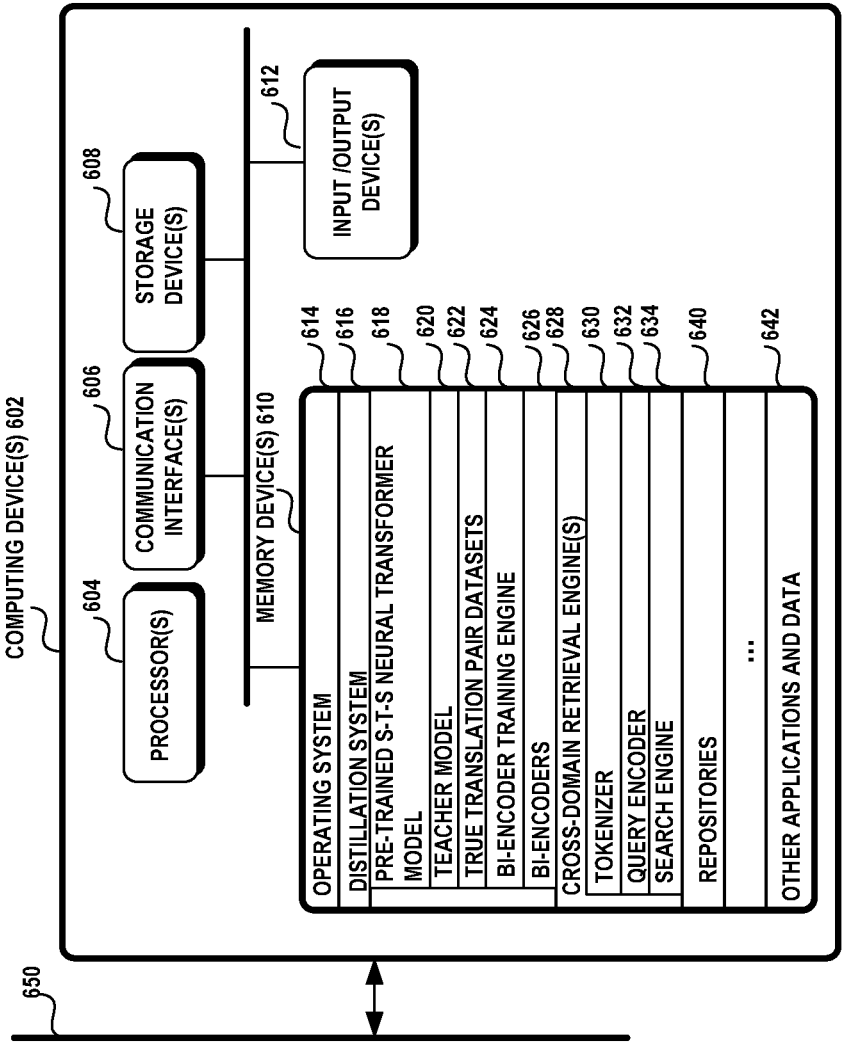

COMPUTING DEVICE(S) 602

PROCESSOR(S) 604

COMMUNICATION INTERFACE(S) 606

STORAGE DEVICE(S) 608

INPUT /OUTPUT DEVICE(S) 612

MEMORY DEVICE(S) 610

OPERATING SYSTEM 614
DISTILLATION SYSTEM 616
PRE-TRAINED S-T-S NEURAL TRANSFORMER MODEL 618
TEACHER MODEL 620
TRUE TRANSLATION PAIR DATASETS 622
BI-ENCODER TRAINING ENGINE 624
BI-ENCODERS 626
CROSS-DOMAIN RETRIEVAL ENGINE(S) 628
TOKENIZER 630
QUERY ENCODER 632
SEARCH ENGINE 634
REPOSITORIES 640
...
OTHER APPLICATIONS AND DATA 642

DISTILLING TRANSFORMERS FOR NEURAL CROSS-DOMAIN SEARCH

BACKGROUND

Neural transformer models are used to solve a variety of complex problems. Neural transformer models employ neural networks that are trained to learn to recognize patterns and make predictions. These models often require an extensive amount of time and resources to train in order to achieve a desired level of accuracy. A model may require a training dataset of real-world data consisting of several million data samples which are mined from various sources. The training itself may take days to weeks of computing time and resources. Neural networks are trained iteratively, making multiple passes over the training dataset before converging to a minimum. The training is iterative and the entire training dataset is passed through the neural network in multiple iterations to meet a target level of accuracy. This type of training requires an enormous amount of computing resources.

In addition, these models are often large requiring an enormous amount of computing resources to deploy making the models impractical to run on devices with limited computing resources. At times, the inference speed is slow making the accuracy obtained by the model insignificant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distillation system extracts knowledge from a large pre-trained sequence-to-sequence neural transformer with attention based on a conditional probability distribution into a bi-encoder which is used to perform neural cross-domain searches. The pre-trained sequence-to-sequence model is fine-tuned on true translation pairs, where one part of a true translation pair is from a first domain and the second part of the true translation pair is from a different domain. The fine-tuned model represents a teacher model which is used to draw 2*M samples of augmented data pairs using the true translation pairs. The teacher model is distilled into the bi-encoder through training of the true translation pairs and their associated augmented data pairs.

The bi-encoder includes a first encoder that jointly learns embeddings for sequences of tokens in the first domain and a second encoder that learns embeddings for sequences of tokens in the second domain. The embeddings share a joint embedding space.

The retrieval system uses the joint embedding space to search for data of the first domain that corresponds to data of the second domain. The retrieval system is able to perform a cross-domain search to find docstrings or natural language text that closely match a source code snippet, to find source code snippets that closely match a docstring or natural language text, to find a semantically-equivalent code translation of a source code snippet in one programming language into a different programming language, and to find a unit test case for a given source code snippet.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 4 is a flow diagram illustrating an example of a method of the distillation system.

FIGS. 5A-5D are schematic diagrams illustrating various cross-domain retrieval engines.

FIG. 6 is a block diagram illustrating a first operating environment.

DETAILED DESCRIPTION

Overview

Figure 1:
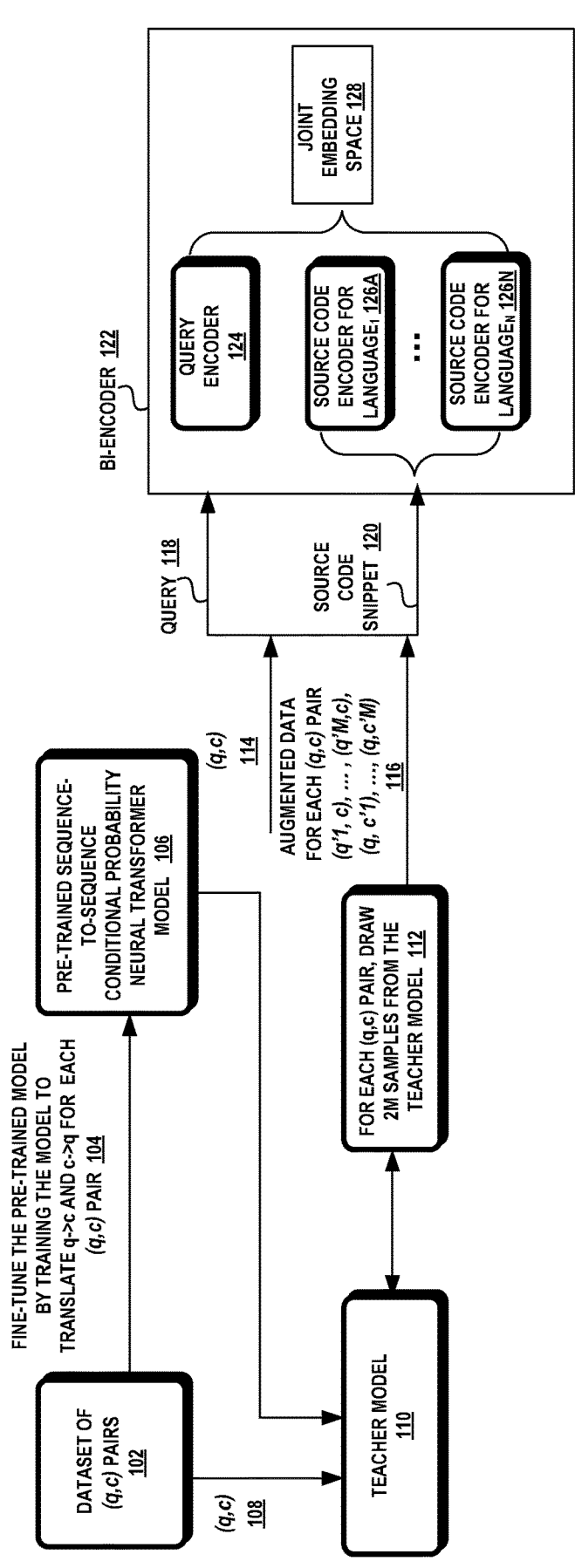
FIG. 1 is a schematic diagram illustrating an example of a system for distilling neural transformers for cross-domain retrieval.

A distillation system is disclosed that extracts knowledge from a pre-trained sequence-to-sequence neural transformer model into a smaller bi-encoder. The pre-trained sequence-to-sequence neural transformer model is trained to translate data from a first domain into a second domain on a large corpus, based on conditional probabilities. The first and the second domain differ. A domain is a specific, specialized field, such as, without limitation, source code snippets in the Python programming language, English natural language text, docstrings, source code snippets in the C# programming language, etc.

A teacher model is generated from the pre-trained model by fine-tuning the pre-trained neural transformer model on a smaller translation task with true translation pairs. The fine-tuned model is then used to generate augmented data values which are used along with the true translation pairs to generate a student model that generates embeddings for both domains that share a joint embedding space.

Knowledge distillation is a technique that extracts knowledge from a large model into a smaller model requiring less computational resources (e.g., memory, CPU/GPU) to deploy. The large model is trained on a large amount of data to learn concise knowledge representations that are generalized to new data. The smaller model is trained to generalize in the same manner as the large model when the small model is trained with the output probabilities produced by the large model.

In one aspect, the techniques described herein are presented with respect to a neural cross-domain search. However, it should be noted that the techniques described herein are not limited to a neural cross-domain search and may be applied to other cross-domain applications, such as, without limitation, those that are discussed in more detail below. A cross-domain search finds data from one domain into a different domain.

For example, a pre-trained sequence-to-sequence neural transformer model which translates a natural language query, $q_i$, into a corresponding source code snippet, $c_j$, using the conditional probability, $p(c_j|q_i)$, is distilled to a smaller bi-encoder. The bi-encoder consists of a query encoder and a source code encoder for each programming language where the query encoder and the various source code encoders share a joint embedding space. The bi-encoder is then used to search for source code snippets $c_j$ of a target programming language having a source code embedding that is close to the query embedding of a target query $q_i$.

The pre-trained conditional-probability sequence-to-sequences neural transformer model is referred to as the teacher model and the bi-encoder is referred to as the student model. In the neural cross-domain search aspect, the logits of the teacher model have incompatible dimensions than the logits of the student model. The logits are the output from the last layer of the neural network of a neural transformer model before the softmax layer. The teacher model has a logit for every token in the model's large vocabulary and the student model has a logit for every query-code pair. This difference prevents the use of traditional distillation techniques that match the logits of the student and teacher models.

The bi-encoder jointly embeds the natural language queries $q_i$ and the corresponding source code snippet $c_j$ so they are mapped to a continuous vector space in which the queries are close to the corresponding source code snippet. The embeddings are mapped with encoder models, such as Bag of Words (BoW), Neural Bag of Words (NBoW), a Long Short-Term Memory (LSTM) or transformer encoder model, to encode the tokens representing a query $q_i$ and a source code snippet $c_j$ and returns a corresponding vector embedding $E_q(q_i)$ and $E_c(c_i)$. It should be noted that the query encoder, $E_q$, and the source code encoder, $E_c$, may be the same model. The embeddings construct a measure of their similarity.

In a traditional bi-encoder code search process, the objective is to maximize the probability of the data conditioned on the parameters $\theta$ of a given model as follows:

$$L(\theta) = \log P(\{q_i\}, \{c_j\} | \theta) = -\Sigma_i \log q_\theta(q_i, c_j) \quad (1)$$

where $N$ is the number of query-code pairs $(q_i, c_j)$, and $$\log q_\theta(q_i, c_j) \propto E_q(q_i, \theta) \cdot E_c(c_i, \theta) / |E_q(q_i, \theta)| |E_c(c_i, \theta)|, \quad (2)$$

which is the bi-encoder model of the log-likelihood of the similarity of the query and source code embeddings of a matched query-code pair. $E_q$ is the query encoder, $E_c$ is the code encoder, $(q_i, c_j)$ is the query-code pair, and $\theta$ are the parameters of the teacher model.

However, these models, $E_c$ and $E_q$, are not encouraged to learn a spectrum of similarity for codes and queries that are not perfectly matched. Two functions with nearly identical behavior will be pushed apart from one another in the embedding space, except for any helpful inductive biases in the embedding. Although the bi-encoder may have a high precision in finding code snippets that match a query perfectly, the bi-encoder will have poor recall since it was trained to place similar code snippets, not perfectly matched, further away in the embedding space.

The technique described herein overcomes these obstacles by augmenting the training data of the bi-encoder with M sampled code snippets and M sampled queries from the teacher model along with the true query-code pairs and using the stochastic gradient descent to distill the teacher model into a more robust bi-encoder. The rationale for this approach is as follows.

The natural way to measure the difference between the probability distributions between the teacher, p(x), and the student model, q(x), is the Kullback-Leibler (KL) divergence:

$$\mathcal{D}_{KL}(p \| q) = \sum_x p(x) \log \frac{p(x)}{q(x)}. \quad (3)$$

When the teacher distribution is the empirical distribution of the data, i.e., p(x)=1 for observed x in the data and p(x)=0 otherwise, then the KL divergence is reduced to the maximum likelihood objective of equation (2) above.

The parameters $\theta$ of the student probability distribution $q_\theta(c_i, q_i)$ are modified which simplifies the KL divergence by omitting constant terms to a new learning objective as the average KL divergence per query $q_i$ as follows:

$$L_{KL}(\theta) = -\frac{1}{N} \sum_{i,j} p(c_j, q_i) \log q_\theta(c_j, q_i), \quad (4)$$

where N is the number of queries.

The objective of equation (4) suggests a method that prescribes computing the probability as judged by the teacher model for all queries and codes in the training corpus, including the ones not known to be already related, using this to weigh the student log probability. The objective of equation (4) is theoretical since it appears to respond to the hypothesis that bi-encoders are hindered by the overly simplistic maximum-likelihood estimation with encourages solely identical matched pairs of queries and codes to be proximate. The evaluation of this objective is impractical since is requires $N^2$ operations thereby preventing the use of stochastic gradient descent. In addition, the astronomically small probability values result in numerical stability. However, since equation (4) is an expectation value over the codes and queries predicted by the teacher model, the objective can be expressed as a sum of the sample from the teacher model as follows:

$$L(\theta) = -\frac{1}{NM} \sum_{(q,c) \sim p(c,q)} p(c, q) \log q_\theta(c, q), \quad (5)$$

where M is the number of query-code pairs sampled from the teacher probability distribution p(q,c). The same bi-encoder model in equation (2) is used for $q_\theta(c, q)$. When the training data of the bi-encoder is augmented with M sampled queries and M sampled codes from the teacher model, the distillation objective becomes the following:

$$L(\theta) = -\sum_i \left( \sum_{c \sim p(c|q_i)} \log q_\theta(c, q_i) + \sum_{q \sim p(q|c_i)} \log q_\theta(c_i, q) \right) \quad (6)$$

Attention now turns to a more detailed description of the system, methods, and devices of the cloud platform.

System

Turning to FIG. 1, there is shown an example of a distillation system 100. The distillation system 100 uses a dataset of true translation pairs 102 to fine-tune 104 a pre-trained sequence-to-sequence conditional-probability neural transformer model 106 into a teacher model 110. The teacher model 110 is distilled into a bi-encoder or student model 122. The bi-encoder 122 includes a query encoder

124 and encoders for each of the different source code language models 126a-126n that share a joint embedding space 128.

The pre-trained sequence-to-sequence conditional-probability neural transformer model 106 is trained to learn to predict an output sequence of one domain given the input sequence of a different domain. The pre-trained sequence-to-sequence neural transformer model 106 finds the output sequence that maximizes the conditional probability P(y|x), where x is the input sequence and y is the output sequence.

In one aspect, the pre-trained sequence-to-sequence neural transformer model 106 translates a natural language text into a source code snippet. In this aspect, the true translation pairs 102 include query-source code snippet pairs, $(q_i, c_j)$, where the query is in the domain of natural language text and the source code snippet is in the domain of the source code of a particular programming language. The natural language text may be a docstring or text that describes its related source code snippet. A true translation pair represents a correct translation of a query into its related source code snippet.

The teacher model 110 is used to generate augmented data for each true query-source code snippet pair, (q, c) 108. In one aspect, 2*M samples are drawn from the teacher model 110 for each true query-source code snippet pair 112. M samples are drawn from application of the teacher model given the true query portion of a pair to produce augmented query-source code snippet pairs $(q, c'_1), (q, c'_2), \ldots, (q, c'_M)$ and M samples are drawn from application of the teacher model given the true code portion of a pair to produce augmented query-source code snippet pairs $(q'_1, c), (q'_2), \ldots, (q'_M, c)$ 116.

The bi-encoder 122 is trained using the 2*M augmented data from each true query-source code snippet pair 116 and the true query-source code snippet pair 114. The query encoder 124 is trained on the query portion 118 of each (q,c) pair and the corresponding augmented pairs 116. Each source code encoder 126a-126n is trained on the code portion of each (q,c) pair 120 and the corresponding augmented pairs of the same programming language 116.

In one aspect, the teacher model 110 and the pre-trained sequence-to-sequence model 106 are neural transformer models 106. A neural transformer model is a type of deep learning model that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions.

Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

The neural transformer model with attention or neural transformer model is pre-trained to predict the output sequence given an input sequence such as to predict a source code snippet (e.g., method body or method signature) given a docstring. The docstring is the natural language text that describes the source code snippet. In one aspect, the model is pre-trained to translate between all pairs of combinations of method signatures, docstrings, and method bodies, which do not have the same feature in both the source and the target.

Figure 2:
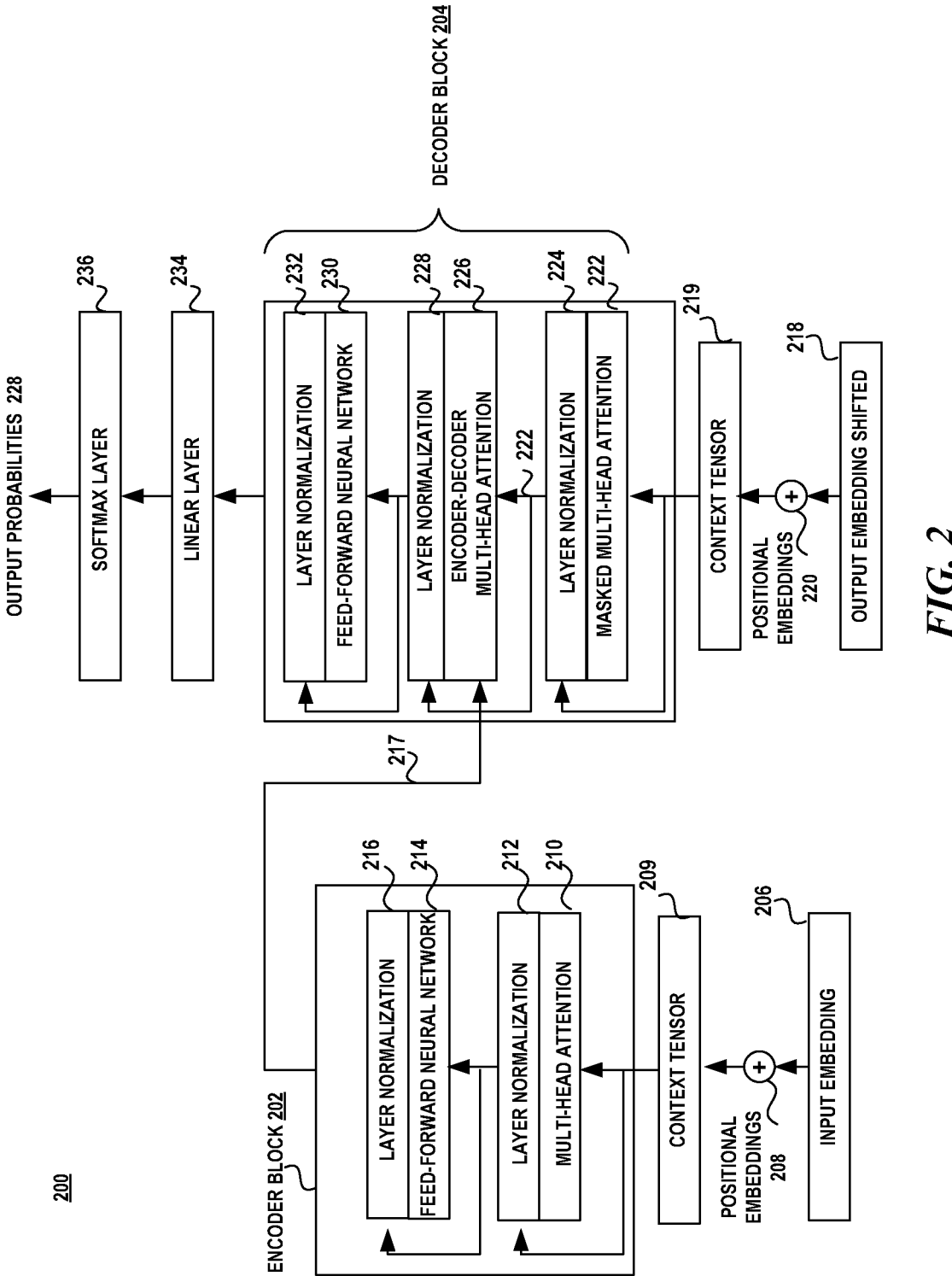
FIG. 2 is a schematic diagram illustrating an example of architecture of an encoder-decoder neural transformer model with attention.

FIG. 2 shows an example of a structure of the neural transformer model in an encoder-decoder configuration. The neural transformer model 200 contains one or more encoder blocks 202 and one or more decoder blocks 204. The initial inputs to an encoder block 202 are the input embeddings 206 of an input sequence of the fine-tuning dataset. In order to retain the order of the tokens in the input sequence, positional embeddings 208 are added to the input embedding 206 forming a context tensor 209. The initial inputs to the decoder block 204 are a shifted sequence of the output embeddings 218 from the previous time step to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention } (Q, K, V) = \text{softmax}\left(\frac{QK^T}{\sqrt{d_k}}\right)V,$$

where the input consists of queries $Q$ and keys K of dimension $d_k$, and values V of dimension $d_v$. $Q$ is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q, K, V) = \text{Concat}(\text{head}_1, \ldots, \text{head}_h)W^O,$$

7

8 where head$_i$=Attention($QW_i^Q,KW_i^K,VW_i^V$), with parameter matrices $$W_i^Q$$

$$\in \mathbb{R}^{d_{model}\times d_k},$$

$$W_i^K$$

$$\in \mathbb{R}^{d_{model}\times d_k},$$

$$W_i^V$$

$$\in \mathbb{R}^{d_{model}\times d_k}, \text{ and } W^O \in \mathbb{R}^{hd_v\times d_{model}}.$$

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately. The output of the top encoder block is a set of attention vectors K and V 217 which is used by the encoder-decoder multi-head attention layer 226 of the decoder block 204.

The decoder block 204 predicts each subtoken t$_i$ in the target language one-by-one at each time step conditioned on all previously-generated target subtokens t$_1$, . . . , t$_{i-1}$. The decoder block 204 consists of three layers. The first layer includes a masked multi-head attention component 222 followed by a layer normalization component 224. The output of the layer normalization component 224 is input into the encoder-decoder multi-head attention component 226 with a residual connection to layer normalization component 228. The second layer includes an encoder-decoder multi-head attention component 226 followed by a layer normalization component 228. The output of layer normalization component 228 is input into the feed forward neural network 230 with a residual connection to layer normalization component 232. The third layer includes a feed forward neural network 230 followed by a layer normalization component 232.

The masked multi-head attention component 222 receives the output embeddings of the previous timestep. The masked multi-head attention component 222 masks the output embeddings from future time steps. The encoder-decoder multi-head attention layer 226 receives queries from the previous decoder layer and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

The linear layer 234 projects the vector produced by the stack of decoders into a logits vector. The softmax layer 236 then turns the scores of the logits vector into probabilities for each subtoken in the vocabulary which are positive and normalized.

Figure 3:
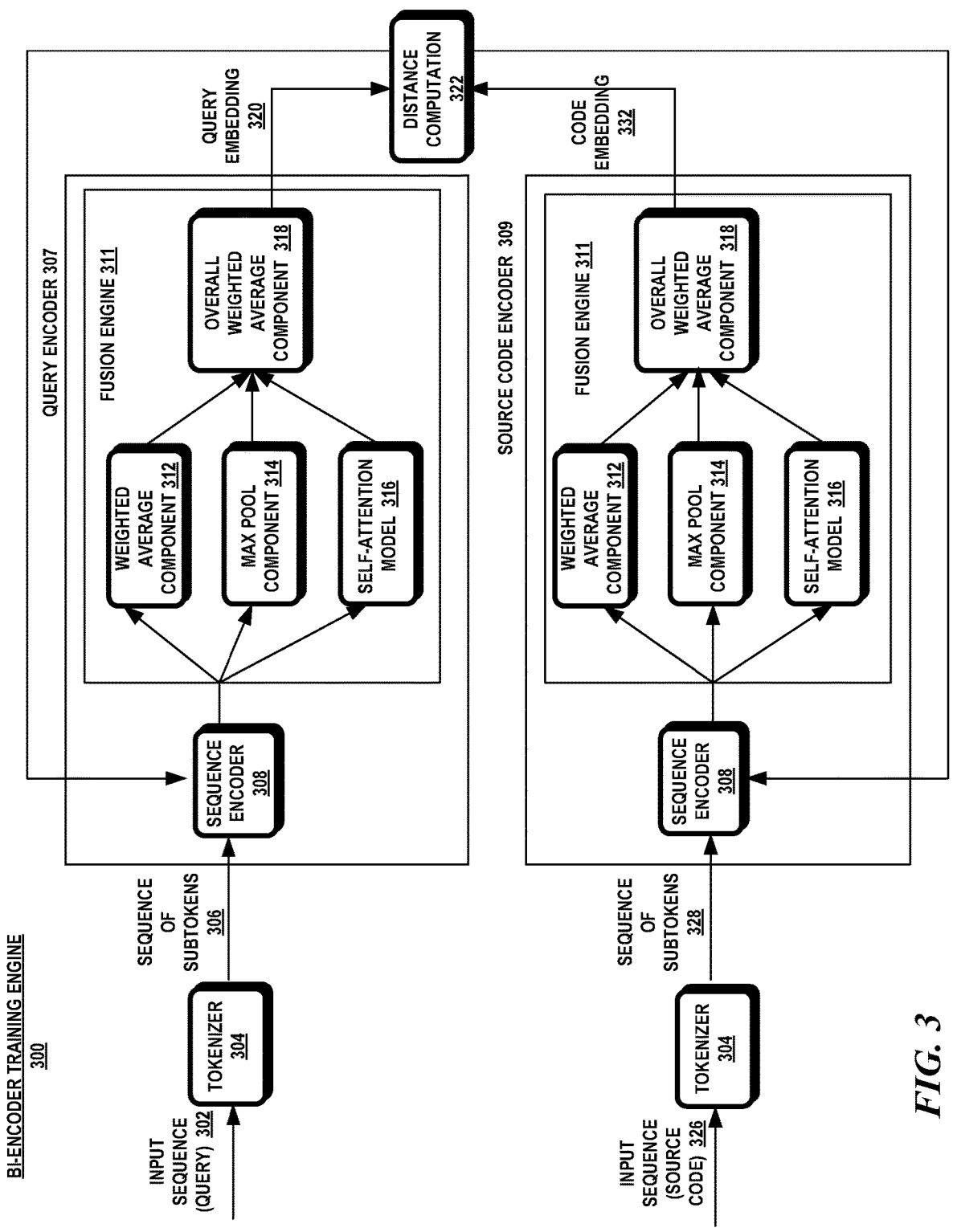
FIG. 3 is a schematic diagram illustrating an example of a configuration of a bi-encoder training engine.

Attention now turns to a more detailed discussion of the bi-encoder. Turning to FIG. 3, there is shown a schematic diagram of the bi-encoder training engine 300 that trains the two encoders of the bi-encoder. The embeddings for each query-source code snippet pair (q,c) and the related augmented data values are processed jointly in the bi-encoder so that the resulting query embedding and a source code embedding are near to each other. In one aspect, the bi-encoder includes a query encoder 307 for the data of the first domain and a source code encoder 309 for the data of the second domain.

The query portion of each query-source code snippet pair (q,c) 302 is parsed into an ordered sequence of tokens that are split using a tokenizer 304, such as a byte-pair encoder (BPE), into a sequence of subtokens 306 which are input into a sequence encoder 308 to learn embeddings of the subtokens in the query.

An encoder converts categorial values into numerical values so that it can be used by a machine learning model. The sequence encoder 308 may be a Neural Bag of Words (NBoW) encoder, a bidirectional recurrent neural network (RNN), a one-dimensional (1D) Convolutional Neural Network (CNN), or a self-attention neural transformer encoder. The sequence encoder 308 learns an embedding for each subtoken in isolation and then combines the subtoken embeddings into a sequence embedding for the entire input sequence 302, 326.

In one aspect, a fusion engine 311 generates a fusion representation that averages the subtoken embeddings into a single vector. The fusion representation uses a weighted average component 312 to perform a weighted average or mean pooling, a max pool component 314 to perform max-pooling, and a self-attention model 316 to perform a self-attention type of weighted average with learnable weights. The output of each of the fusion components is then used by the overall weighted average component 318 to perform a weighted average which results in the sequence embedding, which is either the query embedding 320 or the source code embedding 332.

The distance computation component 322 receives the query embedding 320 and the source code embedding 332 of each query-source code snippet pair and computes the distance between the two embeddings. The distance computation component 322 may utilize a cosine similarity function to compute the distance. The cosine similarity is the cosine of the angle between the vectors representing the query and source code snippet embeddings.

The encoders update the embedding weights by performing a gradient descent on the cosine similarity across all the input sequences in the bi-encoder training dataset until convergence is achieved. The result is a joint embedding space 128 with close embeddings for a query embedding 320 and its related code embedding 332. This is achieved by the encoders minimizing the loss function:

$$\frac{1}{N}\sum_i \log\left(\frac{\exp(Ec(ci)*Eq(qi))}{\sum_j \exp(Ec(cj)*Eq(qj))}\right),$$

where there are N pairs of query/source code snippets (q$_i$, c$_i$), where c$_i$ is the source code snippet, q$_i$ is the natural language query, E$_c$ is the source code encoder, and E$_q$ is the query encoder.

Methods

Attention now turns to a description of the various examples of methods that utilize the system and devices disclosed herein. Operations for the aspects may be further described with reference to various examples of the methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Turning to FIG. 4, there is shown an example of a method 400 for distilling a neural transformer model with attention for neural cross-domain search. A pre-trained sequence-to-sequence conditional-probability neural transformer model with attention is selected and obtained for a desired distillation (block 402). The model is pre-trained to translate an input sequence from a first domain into an output sequence in a second domain and to translate from an input sequence in the second domain into an output sequence in the first domain (block 402). In one aspect, the model is pretrained to translate a sequence of natural language text or query, q, into a source code snippet, c, of a particular programming language and pretrained to translate a source code snippet, c, of a particular programming language into natural language text, q (block 402).

A dataset of true translation pairs is obtained. The term "true translation pair" refers to a known and correct translation of an input sequence from the first domain to an output sequence of the second domain. For example, the correct translation of a docstring into the related source code method. A correct translation of a code snippet in the Python programming language into the C# programming language. (Collectively, block 404).

The dataset of the true translation pairs is then used to fine-tune the pre-trained neural transformer model into the teacher model. For example, for each query and source code snippet pair, (q, c), the query q is applied to the pre-trained neural transformer model to train the model to learn to predict the corresponding source code snippet, c, and the source code snippet, c, is applied to the pre-trained neural transformer model to train the model to learn to predict the corresponding query, q. (Collectively, block 406).

The teacher model is then used to generate the augmented data pairs. An augmented data pair is predicted by the teacher model based on one part of a true translation pair. For some machine learning tasks, there are limited training datasets available for a task. To overcome this obstacle, the teacher model is used to generate augmented data pairs based on a true translation pair, $(q,c) \rightarrow (q'1, c), \ldots, (q'M, c), (q, c'1), \ldots, (q, c'M)$, where q'i and c'i are the machine-generated values. (Collectively, block 408).

The bi-encoder is then trained with each true translation pair (q,c) and its 2*M augmented data values to generate a bi-encoder having a query encoder and a source code encoder for each programming language (block 410). The embeddings of the second domain are then stored in an embedding table since these embeddings are used as the index of the data of the second domain (block 412). The query encoder and the embedding table is then utilized in an intended task (block 414).

There are numerous tasks that can utilize the distillation process disclosed herein. Turning to FIG. 5A, there is shown an example of a source code retrieval system 500 using the generated embeddings. The source code retrieval system 500 searches for a source code snippet in a source code repository 514 that closely matches the embedding of a query. The query may be a docstring or other natural language text describing a related source code snippet. The source code repository 514 is indexed by the source code embeddings produced by the bi-encoder which are stored in the embedding table.

A natural language query, 502, such as a docstring, is parsed by a tokenizer 504 into a sequence of subtokens 505 which are then transformed into a query embedding 510 by a query encoder 506. A search engine 512 searches the embedding table of the source code repository 514 for the closest matching embedding for the query embedding 510. In one aspect, an approximate nearest neighbor search, such as Approximate Nearest Neighbor Oh Yeah, ANNOY, is used to perform the search. The top-k search results are obtained and ranked in order of closest distance to the query embedding 516.

Turning to FIG. 5B, there is shown an example of a docstring retrieval system 520 in which the embeddings computed by the bi-encoder may also be used to search for the natural language text associated with a source code snippet given the source code snippet as the query. The pre-trained model was trained to translate from natural language text to a source code snippet and from a source code snippet to natural language text. The teacher model was also trained in the same manner which allows the bi-encoder to be used for the retrieval of related natural language text, such as the docstring for a related source code snippet. It should be noted that the query encoder 506 refers to the encoder that encodes the sequence of tokens of the first domain.

A source code snippet 522 is parsed by a tokenizer 504 into a sequence of tokens 524. The query encoder 510 generates a code embedding 526 for the source code snippet. The search engine 528 uses the code embedding 526 to search a repository 530 for the closest-matching docstrings. The repository 530 is indexed by the embedding table. The k closest-matching docstrings are ranked in order of the closest distance to the source code embedding 532.

Figures 5C, 5D:
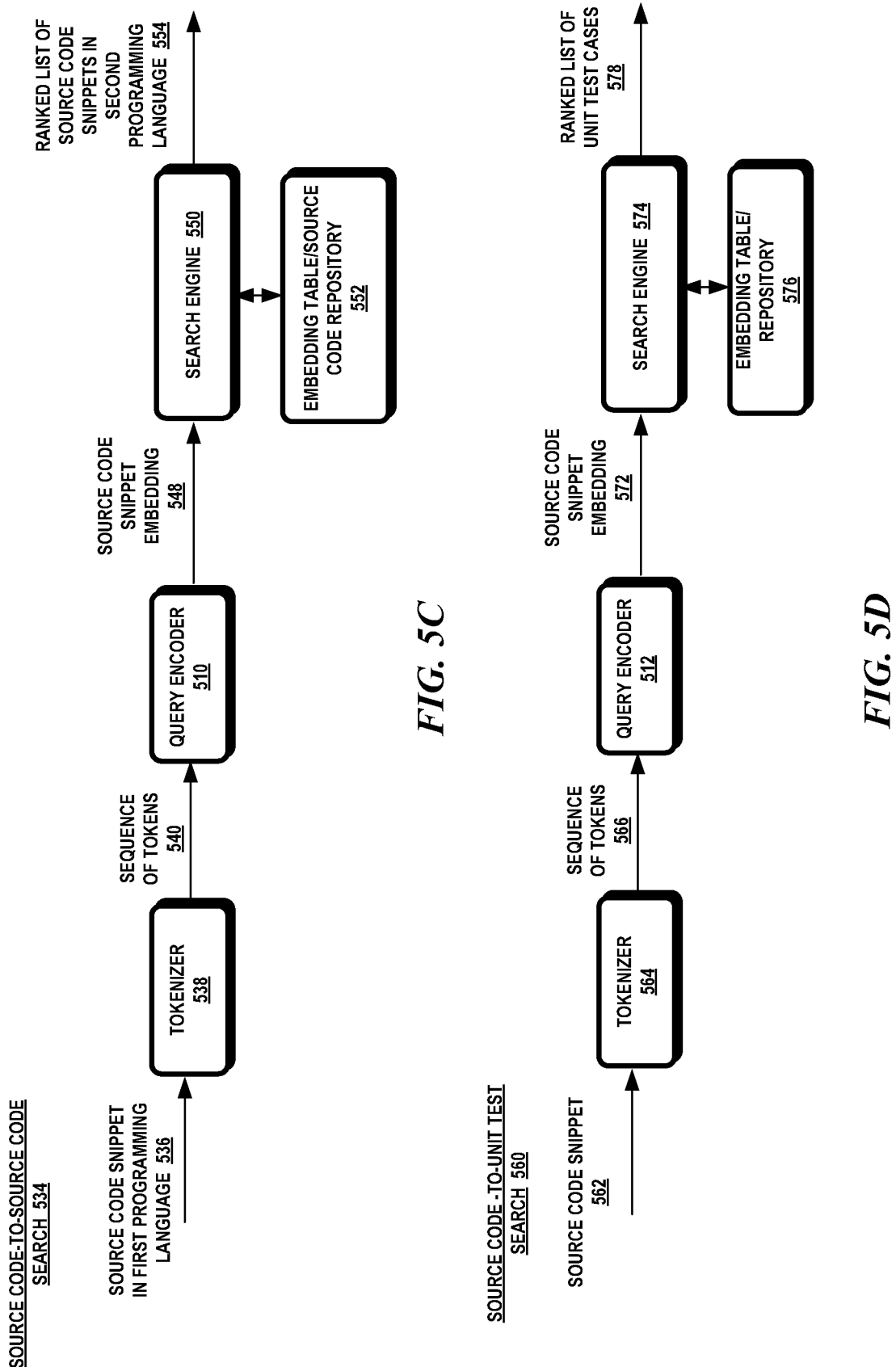

FIG. 5C illustrates an example of a source code retrieval system where the query is a source code snippet in a first programming language and the search is for a semantically-equivalent source code snippet in a second programming language that differs from the first programming language 534. A semantically-equivalent source code snippet is one that has the same program behavior as another source code snippet thereby producing the same actions and results. In this aspect, a pre-trained sequence-to-sequence neural transformer model is trained to learn to translate a source code snippet written in one programming language into a second programming language. This pre-trained model is then fine-tuned with true translation pairs, $(c_1, c_2)$, where $c_1$ is a source code snippet in the first programming language and $c_2$ is the semantically-equivalent source code snippet in the second programming language.

The fine-tuned model is then used to generate augmented data values, $(c_1, c_2) \rightarrow (c_1'1, c_2), \ldots, (c_1'M, c2), (c_1, c_2'1), \ldots, (c_1, c_2'M)$ which are used to train a bi-encoder along with each true translation pair, $(c_1, c_2)$. The bi-encoder includes a first encoder that generates embeddings for source code snippets written in the first programming language and a second encoder that generates embeddings for source code snippets written in the second programming language, where both embeddings share a joint embedding space.

As shown in FIG. 5C, the source code snippet in the first programming language 536 is parsed by a tokenizer 538 into a sequence of tokens 540. The query encoder 510 generates the source code snippet embedding 548 which is used by the search engine 550 to find the k closest matching embeddings from the source code repository 552. The source code repository 552 is indexed by the embedding table which contains the code embeddings of the second programming language. The search engine 550 uses an approximate nearest neighbor search to find the closest-matching source code snippet embeddings. The k closest-matching source code snippets in the second programming language 554 are ranked in order of the closest distance to the source code embedding 548.

In yet another aspect, the techniques described herein may be applied to a unit test case search retrieval. In this aspect, the query is a source code snippet and the search is for a corresponding unit test case for the source code snippet. A unit test checks the individual software modules of a program (e.g., method, class, etc.) in isolation without any interaction with dependencies to ensure that the source code modules operate as intended.

In this aspect, a pre-trained sequence-to-sequence neural transformer model is trained to learn to translate a source code snippet into a related unit test case. This pre-trained model is then fine-tuned with true translation pairs, (c, tc), where c is the source code snippet and tc is the corresponding unit test case.

The fine-tuned model is then used to generate augmented data values, (c,tc)→(c'1, tc), . . . , (c'M, tc), (c, tc'1, . . . , (c, tc'M) which are used to train a bi-encoder along with each true translation pair, (c, tc). The bi-encoder includes a first encoder that generates embeddings for source code snippets and a second encoder that generates embeddings for the unit test cases, where both embeddings share a joint embedding space.

Referring to FIG. 5D, there is shown an example of a unit test case retrieval system where the query is a source code snippet in a first programming language and the search is for a related test case. A source code snippet 562 is parsed by a tokenizer 564 into a sequence of tokens 566. A query encoder 512 generates a source code snippet embedding 572 for the source code snippet 562. The search engine 574 searches the embedding table of a repository 576 to find the closest matching unit test case embeddings. The k closest-matching unit test cases are ranked in order of the closest distance to the source code embedding 578.

Figure 8:
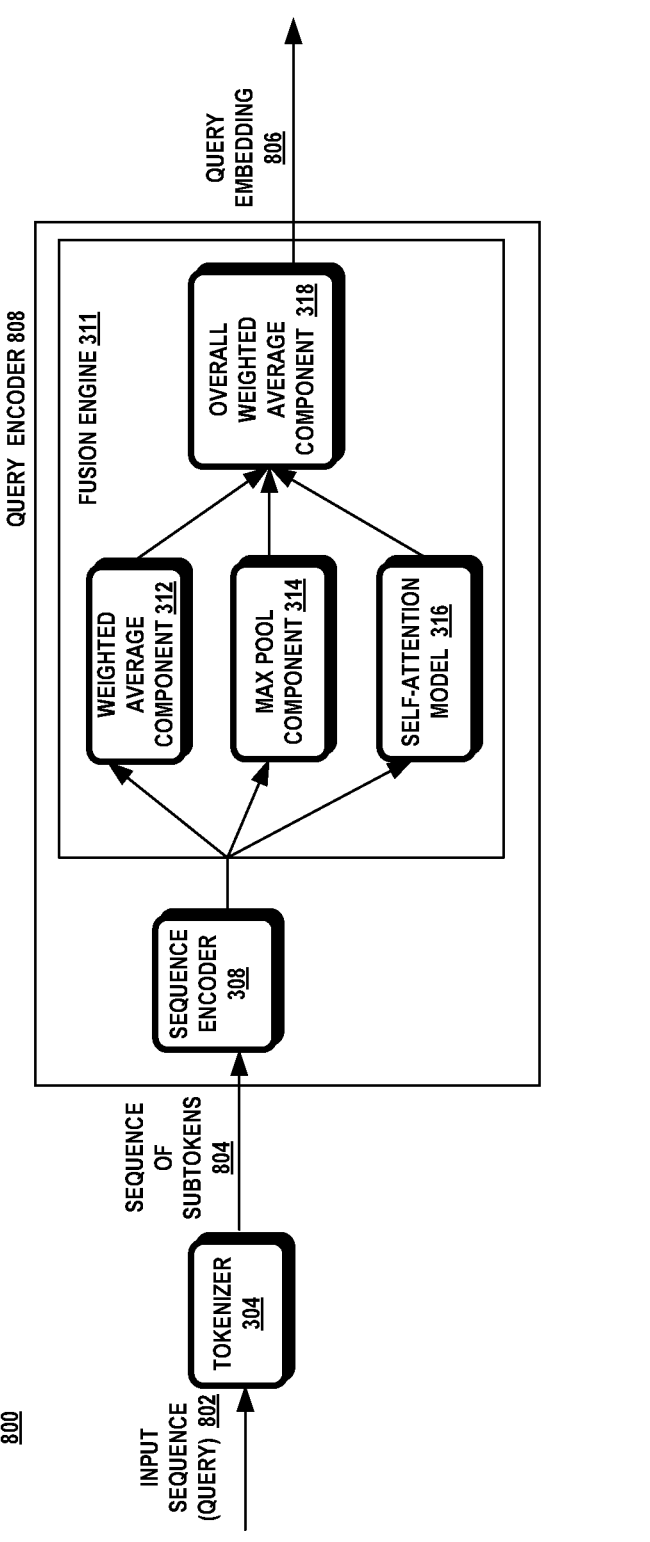
FIG. 8 is a schematic diagram illustrating an example of a sequence encoder.

FIG. 8 illustrates an example embodiment of the computation of a query embedding during a cross-domain search 800. The query is the input sequence that a search engine uses for the information retrieval and may be natural language text or a source code snippet. The tokenizer 304 receives the query or input sequence and parses it into an ordered sequence of tokens that are split into a sequence of subtokens 804. The sequence of subtokens 804 is input into a query encoder 508 having encoder 308 that generates embeddings for the subtokens in the query.

The fusion engine 311 generates a fusion representation that averages the subtoken embeddings into a single vector. The fusion representation uses a weighted average component 312 to perform a weighted average or mean pooling, a max pool component 314 to perform max-pooling, and a self-attention model 316 to perform a self-attention type of weighted average with learnable weights. The output of each of the fusion components is then used by the overall weighted average component 318 to perform a weighted average which results in the query embedding 806.

Operating Environment Examples

Attention now turns to a discussion of a first example of an operating environment 600. FIG. 6 illustrates a first operating environment 600 having a platform (e.g., web service) consisting of one or more computing devices 602 coupled to a network 650. However, it should be noted that the aspects disclosed herein is not constrained to any particular configuration of devices. The components of the platform may be distributed onto one or more computing devices within a same web service or distributed between different web services.

The computing devices 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multiprocessor environment, or a stand-alone computing device having access to remote or local storage devices.

The computing devices 602 may include one or more processors 604, one or more communication interfaces 606, one or more storage devices 608, one or more input/output devices 612, and one or more memory devices 610. A processor 604 may be any commercially available or customized processor and may include dual microprocessors and multi-processor architectures. A communication interface 606 facilitates wired or wireless communications between the computing device 602 and other devices. A storage device 608 may be a computer-readable medium that does not contain propagating signals, such as modulated data signals transmitted through a carrier wave. Examples of a storage device 608 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 608 in a computing device 602. The input/output devices 612 may include a keyboard, mouse, pen, voice input device, touch input device, display, speakers, printers, etc., and any combination thereof.

A memory device or memory 610 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 610 may also include one or more external storage devices or remotely located storage devices that do not pertain to propagated signals, such as modulated data signals transmitted through a carrier wave.

The memory device 610 may contain instructions, components, and data. A component is a software program that performs a specific function and is otherwise known as a module, program, component, engine, and/or application. The memory device 610 may include an operating system 614, a distillation system 616, one or more cross-domain retrieval engines 628, repositories 640 and other applications and data 642. The distillation system 616 may include a pre-trained sequence-to-sequence (s-t-s) neural transformer model 618, a teacher model 620, a true translation pair datasets 622, a bi-encoder training engine 624, and bi-encoders 626. A cross-domain retrieval engine 628 includes a tokenizer 630, a query encoder 632, and a search engine 634.

A computing device 602 may be communicatively coupled to a network 650. The network 650 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 650 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Figure 7:
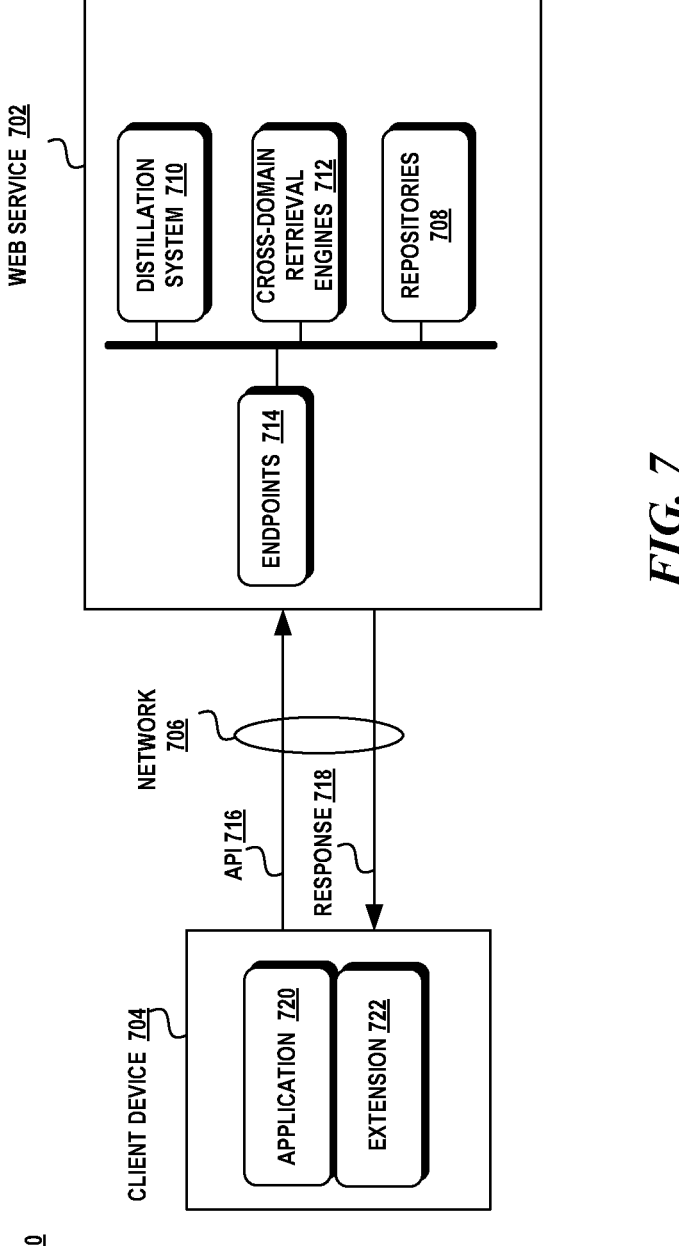
FIG. 7 is a block diagram illustrating a second operating environment.

FIG. 7 illustrates a second example of an operating environment 700 in which a web server 702 interacts with one or more client devices 704 through a network 706 for the retrieval of various information. In one aspect, the server 702 acts as a web service that offers a retrieval service through various application programming interfaces (APIs) over the network 706. In one aspect, the web service 702 is a software and documentation management service that hosts repositories 708 of source code files, documentation, unit test cases, and the like. The web service 702 includes a distillation system 710 that generates the bi-encoders for different tasks. The web service 702 includes cross-domain retrieval engines 712, such as the query to source code retrieval engine, the source code to docstring retrieval engine, the source code to source code retrieval engine, and the source code to unit test case retrieval engine.

In one aspect, the client device 702 interacts with the web service 704 through Representational State Transfer (REST) APIs 716. The REST APIs are service endpoints 714 that support a set of HyperText Transfer Protocol (HTTP) operations or methods to create, retrieve, update, delete or access resources of a web service. The web service 702 responds to the client device's request by transmitting a response 718 including the ranked retrieved results.

The client device 702 includes an application 720 that requests the information from the cross-domain retrieval engines 712. The application may invoke an API call directly or use an extension (e.g., add-on component) 722 to facilitate the communications with a respective endpoint 714. In some aspects, the application 720 may be a source code editor, an Integrated Development Environment (IDE) or other type of software development tool.

CONCLUSION

A system is disclosed comprising: one or more processors; and a memory that stores one or more programs that are configured to be executed by the one or more processors, the one or more programs including instructions to perform acts that: obtain a pre-trained sequence-to-sequence deep learning model that produces a conditional-probability distribution to translate a sequence in a first domain into a sequence in a second domain, wherein the first domain and the second domain differ; generate a teacher model from the pre-trained sequence-to-sequence deep learning model; apply the teacher model with true translation pairs to generate augmented data pairs; and distill the teacher model into a student model using the true translation pairs and the augmented data pairs.

In an aspect, the one or more programs include further instructions to perform acts that: fine-tune the pre-trained sequence-to-sequence deep learning model with the true translation pairs to generate the teacher model. In an aspect, the one or more programs include further instructions to perform acts that: train a bi-encoder with each true translation pair and augmented data pairs to generate embeddings for the first domain and embedding for the second domain, wherein the embeddings for the first domain and the embeddings in the second domain share a joint embedding space.

In an aspect, the teacher model is trained to learn to translate natural language text into a source code snippet. In an aspect, the teacher model is trained to learn to translate a source code snippet into natural language text. In an aspect, the teacher model is trained to learn to translate a source code snippet in a first programming language into a semantically-equivalent source code snippet in a second programming language, wherein the first programming language and the second programming language differ. In an aspect, the teacher model is trained to learn to translate a source code snippet into a unit test case for the source code snippet. In an aspect, the pre-trained sequence-to-sequence deep learning model is a neural transformer model with attention.

A method is disclosed that is performed on a computing device having a processor and a memory. The method comprises: generating a teacher model from a pre-trained sequence-to-sequence deep learning model, wherein the pre-trained sequence-to-sequence deep learning model computes a conditional-probability distribution to translate a sequence in a first domain into a sequence in a second domain, wherein the first domain and the second domain differ; obtaining true translation pairs that translate an input sequence in the first domain into an output sequence in the second domain; applying the teacher model with the true translation pairs to generate augmented data pairs; and distilling the teacher model into a bi-encoder model using the true translation pairs and the augmented data pairs, wherein the bi-encoder model includes a first encoder and a second encoder, wherein the first encoder generates embeddings for the first domain, wherein the second encoder generates embeddings for the second domain, wherein the embeddings for the first domain and the embeddings for the second domain share a common embedding space.

In an aspect, the method further comprises applying the bi-encoder model to generate a first embedding for a first sequence of tokens representing a source code snippet and a second embedding for a second sequence of tokens representing a docstring of the source code snippet. In an aspect, the method further comprises applying the bi-encoder model to generate a first embedding for a first sequence of tokens representing a source code snippet in a first programming language and a second embedding for a second sequence of tokens representing a semantically-equivalent source code snippet in a second programming language, wherein the first programming language and the second programming language differ.

In an aspect, the method further comprises applying the bi-encoder model to generate a first embedding for a first sequence of tokens representing a source code snippet and a second embedding for a unit test case of the source code snippet.

In an aspect, the first encoder includes a Neural Bag of Words (NBoW) encoder, a Bag of Words encoder (BoW), a Long Short-Term Memory (LSTM) or a neural transformer encoder model, wherein the second encoder includes a NBoW encoder, a BoW encoder, a LSTM, or a neural transformer encoder model. In an aspect, the pre-trained sequence-to-sequence deep learning model includes a neural transformer model with attention.

A device is disclosed comprising: a processor and a memory. The processor is configured to perform acts that: distill a sequence-to-sequence neural transformer model into a bi-encoder, the bi-encoder including a first encoder and a second encoder, wherein the first encoder generates an embedding for a sequence of tokens of a first domain, wherein the second encoder generates an embedding for a sequence of tokens of a second domain, wherein the first domain and the second domain differ, wherein the embedding for the sequence of tokens of the first domain and the embedding for the sequence of tokens of the second domain share an embedding space, wherein the sequence-to-sequence neural transformer model translates an input sequence into an output sequence based on conditional probabilities; receive a request to search for an output sequence of tokens of the second domain given a target input sequence of tokens of the first domain; generate an embedding for the target input sequence of tokens; and search a repository for data matching the embedding of the target input sequence of tokens, wherein the repository is indexed by embeddings of sequences of tokens of the second domain.

In an aspect, the first encoder generates embeddings for a sequence of tokens representing a source code snippet in a first programming language, and wherein the second encoder generates embeddings for a sequence of tokens representing a docstring for the source code snippet in the first programming language. In an aspect, the first encoder generates embeddings for a sequence of tokens representing a source code snippet in a first programming language, and wherein the second encoder generates embeddings for a sequence of tokens representing a semantically-equivalent source code snippet in a second programming language, wherein the first programming language and the second programming language differ.

In an aspect, the first encoder generates embeddings for a sequence of tokens representing a source code snippet in a first programming language, and wherein the second encoder generates embeddings for a sequence of tokens representing a unit test case for the source code snippet in the first programming language. In an aspect, the first encoder includes a Neural Bag of Words (NBoW) encoder, a Bag of Words encoder (BoW), a Long Short-Term Memory (LSTM) or a neural transformer encoder model, wherein the second encoder includes a NBoW encoder, a BoW encoder, a LSTM, or a neural transformer encoder model. In an aspect, the first encoder and the second encoder are both a NBoW encoder, a BoW encoder, a LSTM, or a neural transformer encoder model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system for training a bi-encoder for a neural cross-domain search, comprising:

a processor; and a memory that stores a program configured to be executed by the processor, wherein the program comprises instructions to perform acts that:

obtain a pre-trained sequence-to-sequence deep learning model that produces a conditional-probability distribution to translate a sequence in a first domain into a sequence in a second domain and to translate the sequence in the second domain into the sequence in the first domain, wherein the first domain and the second domain differ, wherein the pre-trained sequence-to-sequence deep learning model comprises at least one encoder and at least one decoder, wherein the sequence in the first domain comprises natural language text and/or source code, wherein the sequence in the second domain comprises natural language text and/or source code;

obtain a plurality of true translation pairs, wherein a true translation pair of the plurality of true translation pairs comprises a first sequence in the first domain and a second sequence in the second domain;

train the pre-trained sequence-to-sequence deep learning model with the plurality of true translation pairs to generate a teacher model;

cause the teacher model to generate a plurality of augmented data pairs for each true translation pair of the plurality of true translation pairs, wherein an augmented data pair comprises one sequence from the first domain paired with a model-generated sequence in the second domain and one sequence from the second domain paired with a model-generated sequence in the first domain, wherein the teacher model generates the model-generated sequence in the first domain and the model-generated sequence in the second domain;

create a training dataset comprising the plurality of augmented data pairs and the plurality of true translation pairs; and train a bi-encoder with the training dataset and a stochastic gradient descent to distill the teacher model into a trained bi-encoder, wherein the trained bi-encoder generates embeddings for the first domain and embeddings for the second domain, wherein the embeddings for the first domain and the embeddings for the second domain share a joint embedding space.

2. The system of claim 1, wherein the bi-encoder comprises a first encoder and a second encoder, wherein the first encoder jointly learns embeddings for sequences of tokens in the first domain with embeddings in the second domain, wherein the second encoder jointly learns embeddings for sequences of tokens in the second domain with embeddings in the first domain.

3. The system of claim 1, wherein the program comprises instructions to perform acts that:

receive a request to search for an output sequence of tokens of the second domain given a target input sequence of tokens of the first domain;

generate, from the bi-encoder, an embedding for the target input sequence of tokens; and search a repository for data matching the embedding of the target input sequence of tokens, wherein the repository is indexed by embeddings of sequences of tokens of the second domain generated by the bi-encoder.

4. The system of claim 1, wherein the sequence in the first domain comprises a query in natural language text, and wherein the sequence in the second domain comprises source code associated with the query in the natural language text.

5. The system of claim 1, wherein the sequence in the first domain comprises a source code snippet, and wherein the sequence in the second domain comprises a docstring in natural language text.

6. The system of claim 1, wherein the sequence in the first domain comprises a source code snippet in a first programming language, and wherein the sequence in the second domain comprises a source code snippet in a second programming language.

7. The system of claim 1, wherein the sequence in the first domain comprises a source code snippet, and wherein the sequence in the second domain comprises a unit test case associated with the source code snippet.

8. The system of claim 1, wherein the pre-trained sequence-to-sequence deep learning model is a neural transformer model with attention.

9. A computer-implemented method for training a bi-encoder for a neural cross-domain search, comprising:

obtaining a pre-trained sequence-to-sequence deep learning model that produces a conditional-probability distribution to translate a sequence in a first domain into a sequence in a second domain and to translate the sequence in the second domain into the sequence in the first domain, wherein the first domain and the second domain differ, wherein the pre-trained sequence-to-sequence deep learning model comprises at least one encoder and at least one decoder, wherein the sequence in the first domain comprises natural language text and/or source code, wherein the sequence in the second domain comprises natural language text and/or source code;

obtaining a plurality of true translation pairs, wherein a true translation pair of the plurality of true translation pairs comprises a first sequence in the first domain and a second sequence in the second domain;

training the pre-trained sequence-to-sequence deep learning model with the plurality of true translation pairs to generate a teacher model;

causing the teacher model to generate a plurality of augmented data pairs for each true translation pair of the plurality of true translation pairs, wherein an augmented data pair comprises one sequence from the first domain paired with a model-generated sequence in the second domain and one sequence from the second domain paired with a model-generated sequence in the first domain, wherein the teacher model generates the model-generated sequence in the first domain and the model-generated sequence in the second domain;

creating a training dataset comprising the plurality of augmented data pairs and the plurality of true translation pairs; and training a bi-encoder with the training dataset and stochastic gradient descent to distill the teacher model into a trained bi-encoder, wherein the trained bi-encoder generates embeddings for the first domain and embeddings for the second domain, wherein the embeddings for the first domain and the embeddings for the second domain share a joint embedding space.

10. The method of claim 9, wherein the bi-encoder comprises a first encoder and a second encoder, wherein the first encoder jointly learns embeddings for sequences of tokens in the first domain with embeddings in the second domain, wherein the second encoder jointly learns embeddings for sequences of tokens in the second domain with embeddings in the first domain.

11. The method of claim 9, further comprising:

receiving a request to search for an output sequence of tokens of the second domain given a target input sequence of tokens of the first domain;

generating, from the bi-encoder, an embedding for the target input sequence of tokens; and searching a repository for data matching the embedding of the target input sequence of tokens, wherein the repository is indexed by embeddings of sequences of tokens of the second domain generated by the bi-encoder.

12. The method of claim 9, wherein the sequence in the first domain comprises a query in natural language text, and wherein the sequence in the second domain comprises source code associated with the query in the natural language text.

13. The method of claim 9, wherein the sequence in the first domain comprises a source code snippet, and wherein the sequence in the second domain comprises a docstring in natural language text.

14. The method of claim 9, wherein the sequence in the first domain comprises a source code snippet in a first programming language, and wherein the sequence in the second domain comprises a source code snippet in a second programming language.

15. The method of claim 9, wherein the sequence in the first domain comprises a source code snippet, and wherein the sequence in the second domain comprises a unit test case associated with the source code snippet.

16. A non-transitory hardware storage device having stored thereon computer executable instructions that are structured to be executable by a processor of a computing device to thereby cause the computing device to train a bi-encoder for a neural cross-domain search by performing actions that:

access a pre-trained sequence-to-sequence deep learning model that produces a conditional-probability distribution to translate a sequence in a first domain into a sequence in a second domain and to translate the sequence in the second domain into the sequence in the first domain, wherein the first domain and the second domain differ, wherein the pre-trained sequence-to-sequence deep learning model comprises at least one encoder and at least one decoder, wherein the sequence in the first domain comprises natural language text and/or source code, wherein the sequence in the second domain comprises natural language text and/or source code;

obtain a plurality of true translation pairs, wherein a true translation pair of the plurality of true translation pairs comprises a first sequence in the first domain and a second sequence in the second domain;

train the pre-trained sequence-to-sequence deep learning model with the plurality of true translation pairs to generate a teacher model;

cause the teacher model to generate a plurality of augmented data pairs for each true translation pair of the plurality of true translation pairs, wherein an augmented data pair comprises one sequence from the first domain paired with a model-generated sequence in the second domain and one sequence from the second domain paired with a model-generated sequence in the first domain, wherein the teacher model generates the model-generated sequence in the first domain and the model-generated sequence in the second domain;

generate a training dataset comprising the plurality of augmented data pairs and the plurality of true translation pairs; and train a bi-encoder with the training dataset and stochastic gradient descent to distill the teacher model into a trained bi-encoder, wherein the trained bi-encoder generates embeddings for the first domain and embeddings for the second domain, wherein the embeddings for the first domain and the embeddings for the second domain share a joint embedding space.

17. The non-transitory hardware storage device of claim 16, wherein the bi-encoder comprises a first encoder and a second encoder, wherein the first encoder jointly learns embeddings for sequences of tokens in the first domain with embeddings in the second domain, wherein the second encoder jointly learns embeddings for sequences of tokens in the second domain with embeddings in the first domain.

18. The non-transitory hardware storage device of claim 16, having stored thereon computer executable instructions that are structured to be executable by a processor of a computing device to thereby cause the computing device to train a bi-encoder for a neural cross-domain search by performing actions that:

receive a request to search for an output sequence of tokens of the second domain given a target input sequence of tokens of the first domain;

generate, from the bi-encoder, an embedding for the target input sequence of tokens; and search a repository for data matching the embedding of the target input sequence of tokens, wherein the repository is indexed by embeddings of sequences of tokens of the second domain generated by the bi-encoder.

19. The non-transitory hardware storage device of claim 16, wherein the sequence in the first domain comprises a source code snippet, and wherein the sequence in the second domain comprises a unit test case associated with the source code snippet.

20. The non-transitory hardware storage device of claim 16, wherein the sequence in the first domain comprises a source code snippet, and wherein the sequence in the second domain comprises a docstring in natural language text.

* * * * *